(12) United States Patent
Arao

(10) Patent No.: US 12,579,403 B2
(45) Date of Patent: Mar. 17, 2026

(54) ANTENNA PATTERN AND RFID INLAY

(71) Applicant: SATO HOLDINGS KABUSHIKI KAISHA, Tokyo (JP)

(72) Inventor: Yuichi Arao, Tokyo (JP)

(73) Assignee: SATO CORPORATION, Tokyo (JP)

( * ) Notice: Subject to any disclaimer, the term of this patent is extended or adjusted under 35 U.S.C. 154(b) by 0 days.

(21) Appl. No.: 18/834,909

(22) PCT Filed: Nov. 29, 2022

(86) PCT No.: PCT/JP2022/043862
§ 371 (c)(1),
(2) Date: Jul. 31, 2024

(87) PCT Pub. No.: WO2023/153049
PCT Pub. Date: Aug. 17, 2023

(65) Prior Publication Data
US 2025/0124249 A1     Apr. 17, 2025

(30) Foreign Application Priority Data

Feb. 8, 2022     (JP) ................................. 2022-018039

(51) Int. Cl.
*G06K 19/077*     (2006.01)
*H01Q 1/22*     (2006.01)
(Continued)

(52) U.S. Cl.
CPC ..... *G06K 19/07786* (2013.01); *H01Q 1/2225* (2013.01)

(58) Field of Classification Search
CPC .. G06K 19/07786; H01Q 1/2225; H01Q 1/36; H01Q 9/065; H01Q 9/26
(Continued)

(56) References Cited

U.S. PATENT DOCUMENTS

| | | |
|---|---|---|
| 9,547,817 B2 | 1/2017 | Akamatsu et al. |
| 2007/0200782 A1 | 8/2007 | Hayama et al. |

(Continued)

FOREIGN PATENT DOCUMENTS

| | | |
|---|---|---|
| JP | 2005-236468 A | 9/2005 |
| JP | 2006-033068 A | 2/2006 |

(Continued)

OTHER PUBLICATIONS

Extended European Search Report issued in EP Appl. No. 22926065.8 dated Apr. 7, 2025.

(Continued)

*Primary Examiner* — Toan C Ly
(74) *Attorney, Agent, or Firm* — Foley & Lardner LLP

(57) ABSTRACT

An aspect of the present invention is an antenna pattern used in a UHF-band RFID inlay. The antenna pattern includes a first element and a second element. The first element is formed to include a loop portion and an emission portion. The loop portion includes a pair of electric power supply portions. The emission portion is connected to the loop portion, and extends line-symmetrically from the loop portion. The emission portion operates as a dipole antenna to emit a radio wave whose half wavelength is a first length. The second element is formed apart from the first element. The second element operates as a dipole antenna by electromagnetic coupling with the first element to emit a radio wave whose half wavelength is a second length. The second length is different from the first length.

19 Claims, 9 Drawing Sheets

(51) Int. Cl.
    *H01Q 9/06*         (2006.01)
    *H01Q 9/26*         (2006.01)

(58) Field of Classification Search
    USPC ......................................................... 235/492
    See application file for complete search history.

(56)                References Cited

U.S. PATENT DOCUMENTS

| 2010/0097191 | A1 | 4/2010 | Yamagajo et al. |
| 2017/0117607 | A1 * | 4/2017 | Louzir ............. G06K 19/07767 |

FOREIGN PATENT DOCUMENTS

| JP | 2007-228325 A | 9/2007 | |
| JP | 2009-194670 A | 8/2009 | |
| WO | WO-2019163473 A1 * | 8/2019 | ........... B42D 25/305 |

OTHER PUBLICATIONS

Office Action issued in Japanese Appl. No. 2022-018039 dated Jan. 6, 2026.

* cited by examiner

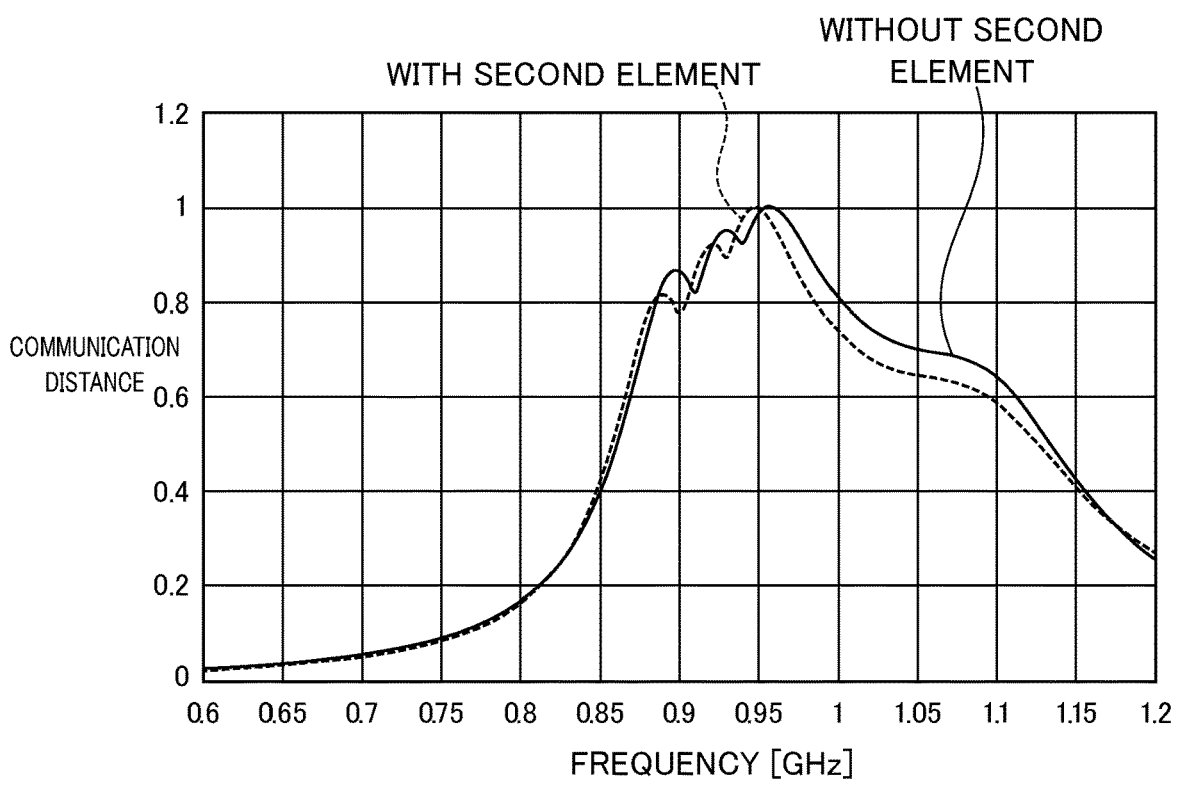
CASE WITHOUT ATTACHMENT TARGET
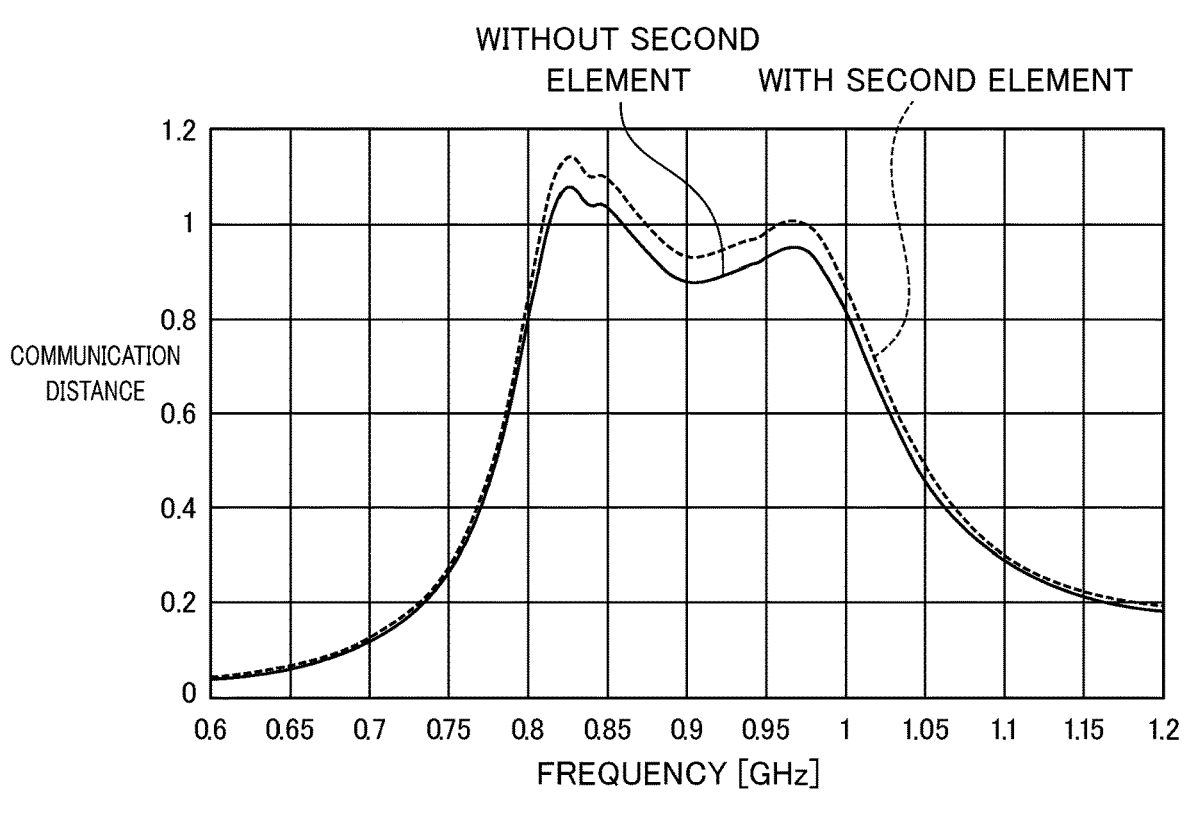
FIG.3 — CASE OF Er = 3

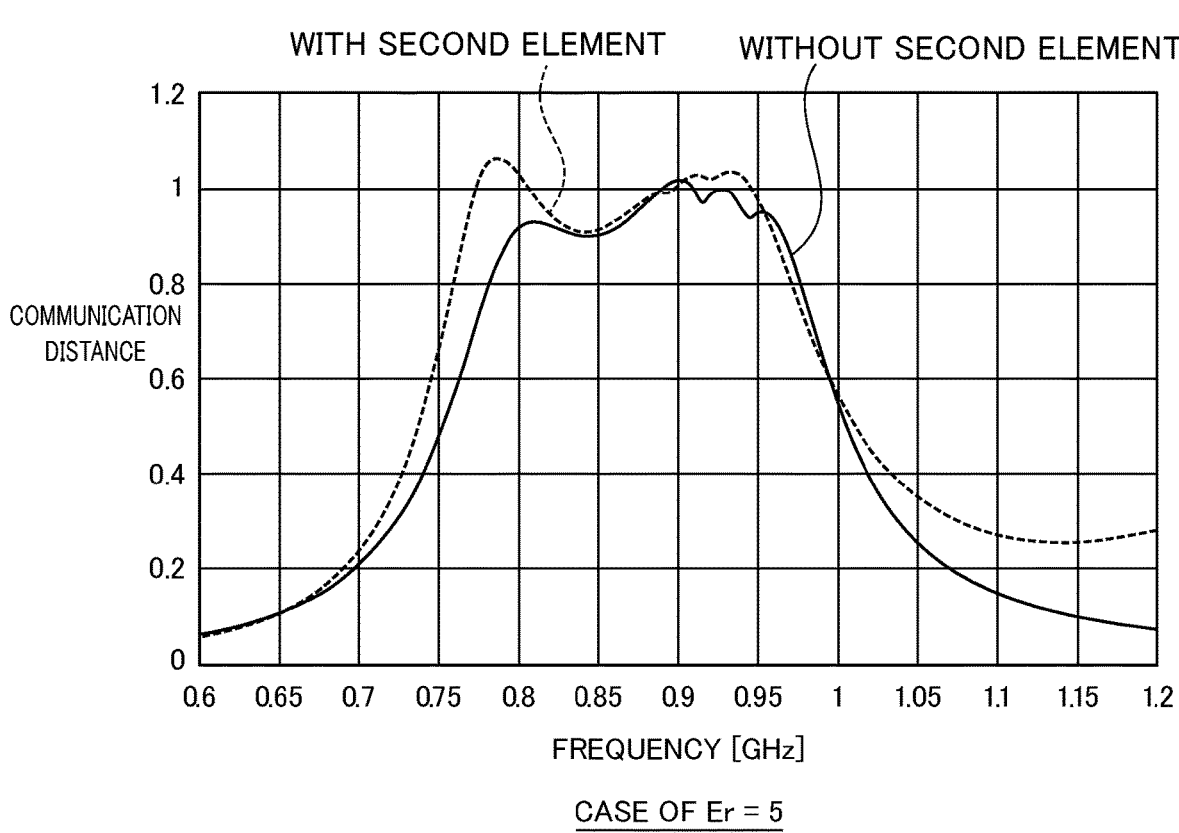
CASE OF Er = 5
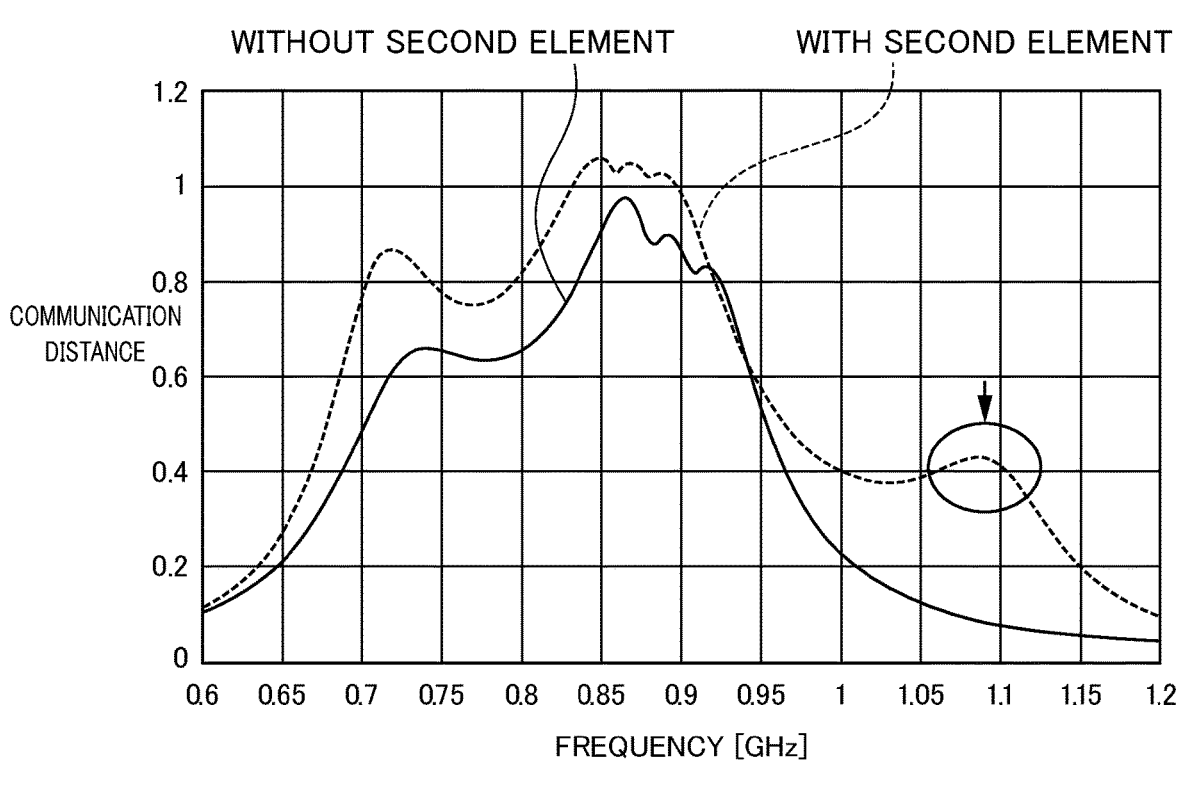
FIG.4     CASE OF Er = 7

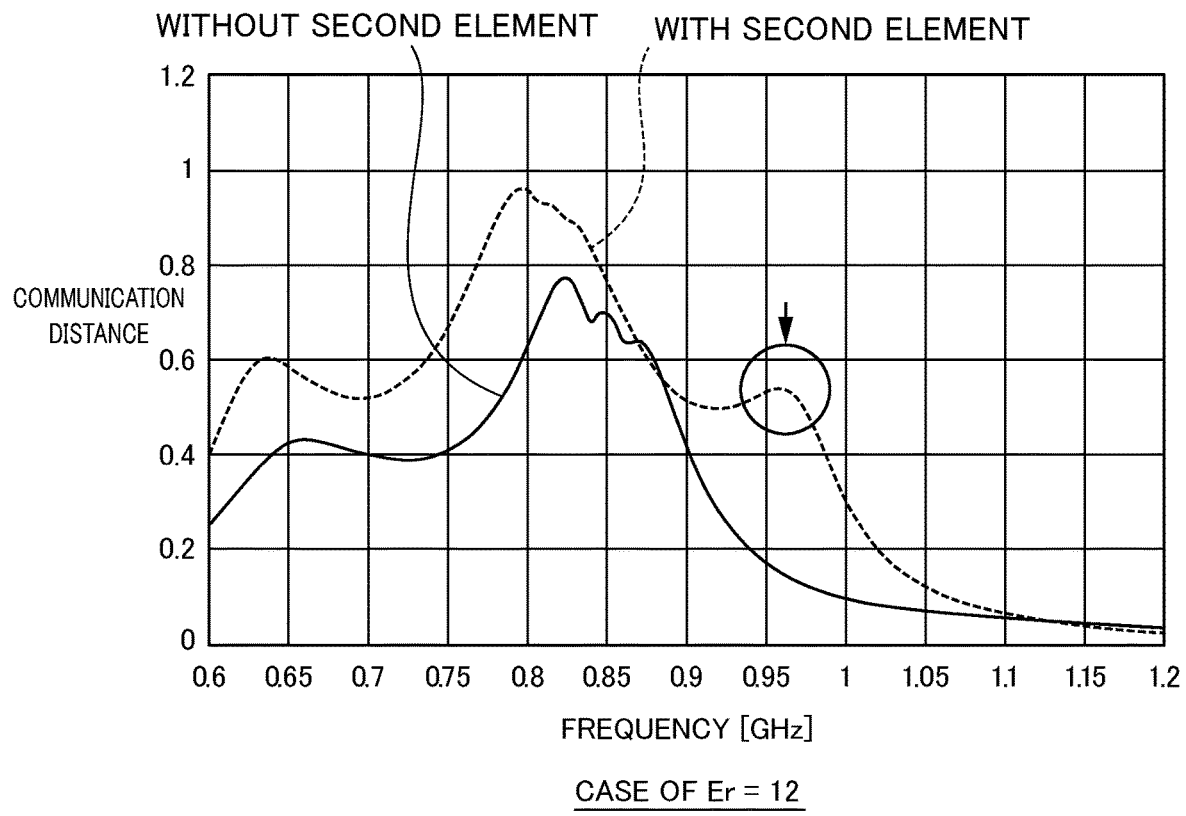
CASE OF Er = 12
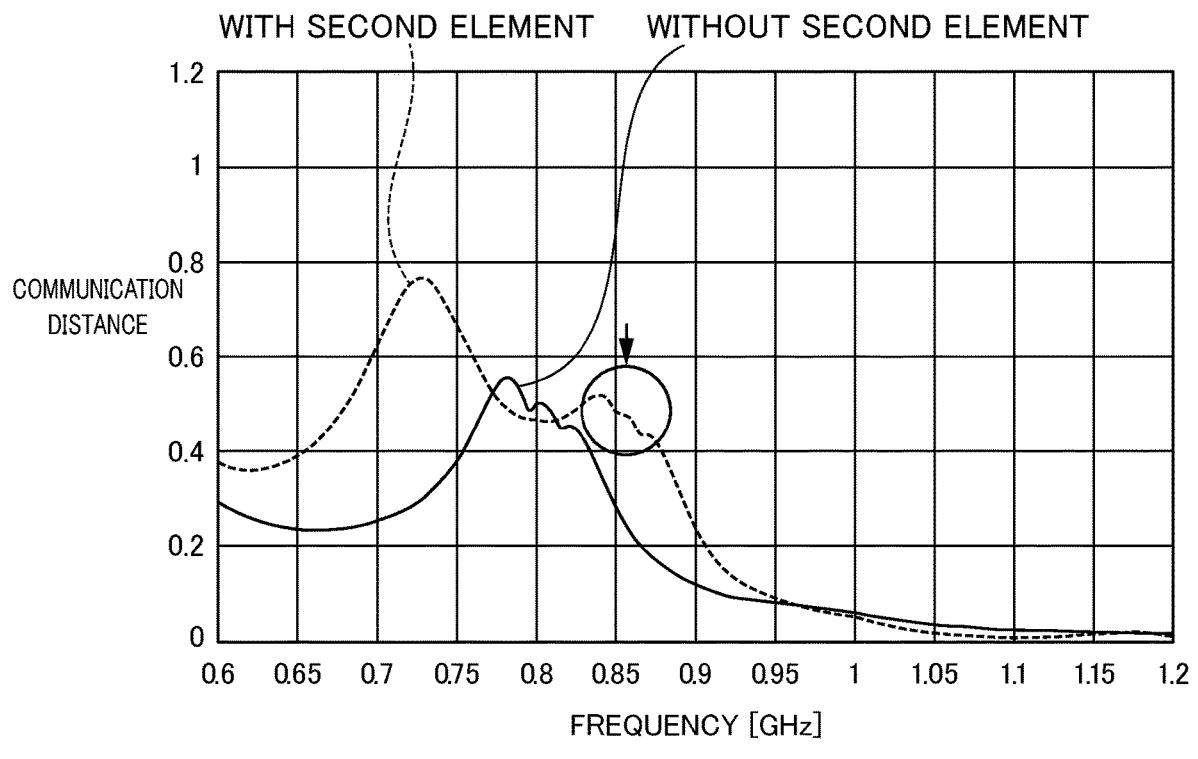
FIG.5        CASE OF Er = 20

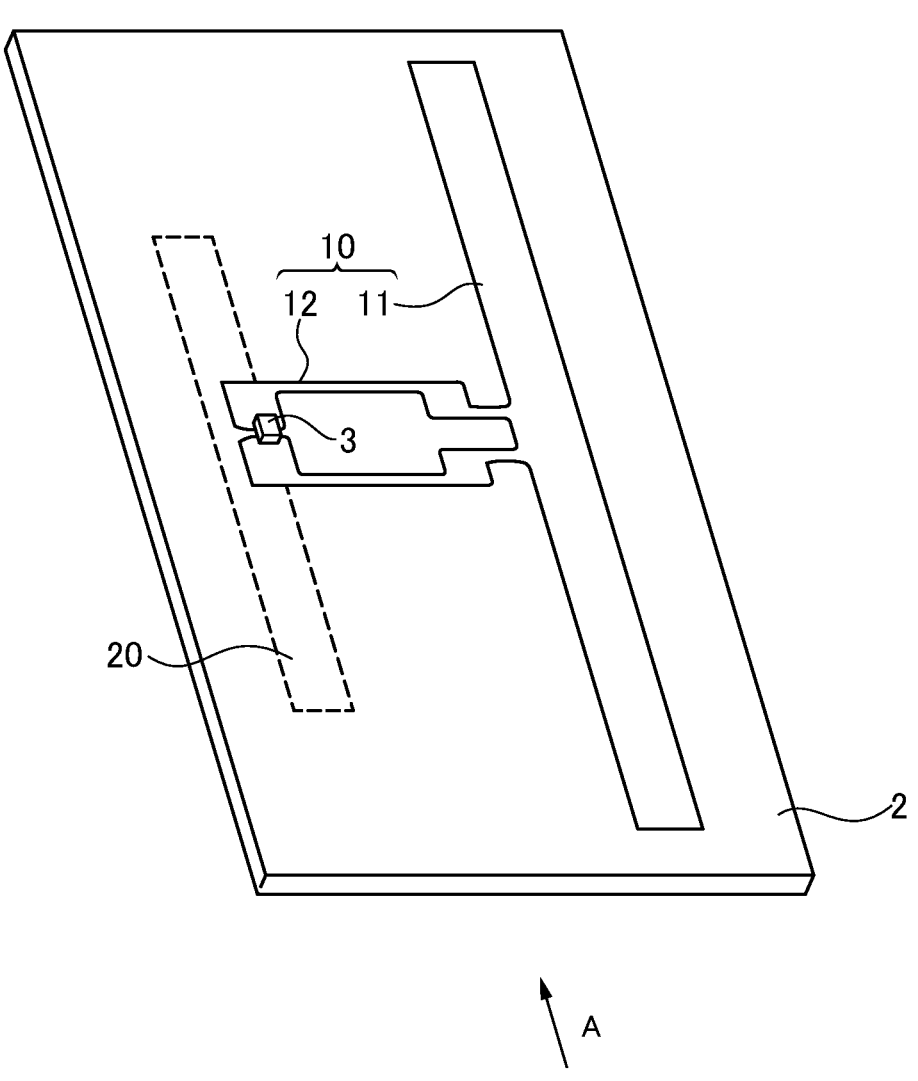
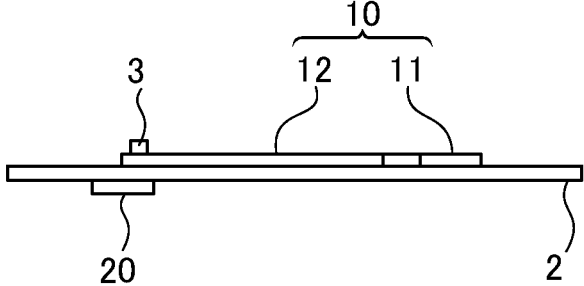
VIEW IN ARROW A
FIG. 8

ANTENNA PATTERN AND RFID INLAY

FIELD

The present invention relates to an antenna pattern and an RFID inlay.

BACKGROUND

In recent years, radio frequency identification (RFID) media compatible with an RFID technique have become widespread in fields such as manufacturing, management, and distribution of products. Particularly, RFID media in the UHF band (a frequency band from 860 MHz to 960 MHz) are often used in inventory management, product inspection, and the like since the RFID media for the UHF band have a relatively long communication distance and are suitable for batch reading.

Examples of RFID media include tags, labels, and wristbands. An RFID inlay (referred to also as an RFID inlet) is incorporated in an RFID medium. An RFID inlay includes a substrate such as paper or a resin film, and an IC chip and an antenna pattern that are arranged on the substrate. The IC chip is made to store information (e.g., identification information) concerning an object (hereinafter, referred to as an "attachment target" when appropriate) to which the RFID medium is attached. The substrate of the RFID inlay serves also as a substrate of the RFID medium in some cases.

Japanese Patent Application Laid-Open Publication No. 2007-228325 discloses one example of an antenna pattern of an RFID inlay. According to this example, the antenna pattern includes a meander portion and a pair of emission portions. The meander portion consists of a pair of meander line conductors that extend from an electric power supply portion as a center to both sides of the electric power supply portion. A pair of the emission portions are each formed by a conductor, and are connected to respective outer end portions of the meander portion.

BRIEF SUMMARY

Technical Problem

Incidentally, for example, when an RFID inlay is incorporated in an RFID label, and the RFID label is affixed to an attachment target, the RFID inlay is attached on a side of an affixing surface (back surface) of the label in such a way as to become inconspicuous. For this reason, the RFID inlay is in direct contact with or close to the attachment target. Here, the attachment target is considered to be made of any of various materials such as cardboard, resin, and glass, and can have any of various relative permittivity (e.g., 1 to 80), depending on the material. Thus, a communication distance between the RFID inlay and a reader-writer can become lower than a designed value, depending on the attachment target as an affixing target.

In other words, even when an antenna pattern is designed for an assumed case where an RFID label is affixed to an attachment target made of a material having a specific relative permittivity, an wavelength shortening effect causes a frequency property of an antenna impedance to shift as a whole to a lower-range side. This occurs when an RFID inlay is affixed to a material having a relative permittivity higher than the specific relative permittivity of the above-mentioned material in the assumed case. Accordingly, a mismatch occurs between the antenna impedance and an IC impedance. Thus, less electric power is supplied to the IC chip. As a result, a communication distance decreases. When an RFID inlay is affixed to an attachment target such as a bottle containing liquid, a relative permittivity of the attachment target changes accompanying an increase or decrease in the inside liquid, and consequently, an original communication distance is not be ensured in some cases.

In view of the above, an object of the present invention is to provide an antenna pattern of an RFID inlay that can suppress a decrease in a communication distance even when the RFID inlay is attached to any of attachment targets having various relative permittivity.

Solution to Problem

An aspect of the present invention provides an antenna pattern used in a UHF-band RFID inlay, including:

a first element formed to include a loop portion and an emission portion, the loop portion including a pair of electric power supply portions, the emission portion being connected to the loop portion and extending line-symmetrically from the loop portion, the emission portion operating as a dipole antenna to emit a radio wave whose half wavelength is a first length; and a second element formed apart from the first element, the second element operating as a dipole antenna by electromagnetic coupling with the first element to emit a radio wave whose half wavelength is a second length, the second length being different from the first length.

Advantageous Effects

The aspect of the present invention provides the antenna pattern of an RFID inlay that can suppress a decrease in a communication distance even when the RFID inlay is attached to any of attachment targets having various relative permittivity.

BRIEF DESCRIPTION OF DRAWINGS

FIG. 3 illustrates electromagnetic field simulation results of a frequency and a communication distance of RFID inlays.

FIG. 4 illustrates electromagnetic field simulation results of a frequency and a communication distance of the RFID inlays.

FIG. 5 illustrates electromagnetic field simulation results of a frequency and a communication distance of the RFID inlays.

FIG. 8 is a perspective view of an RFID inlay according to one embodiment, and a view in the arrow A.

DETAILED DESCRIPTION

Figure 1:
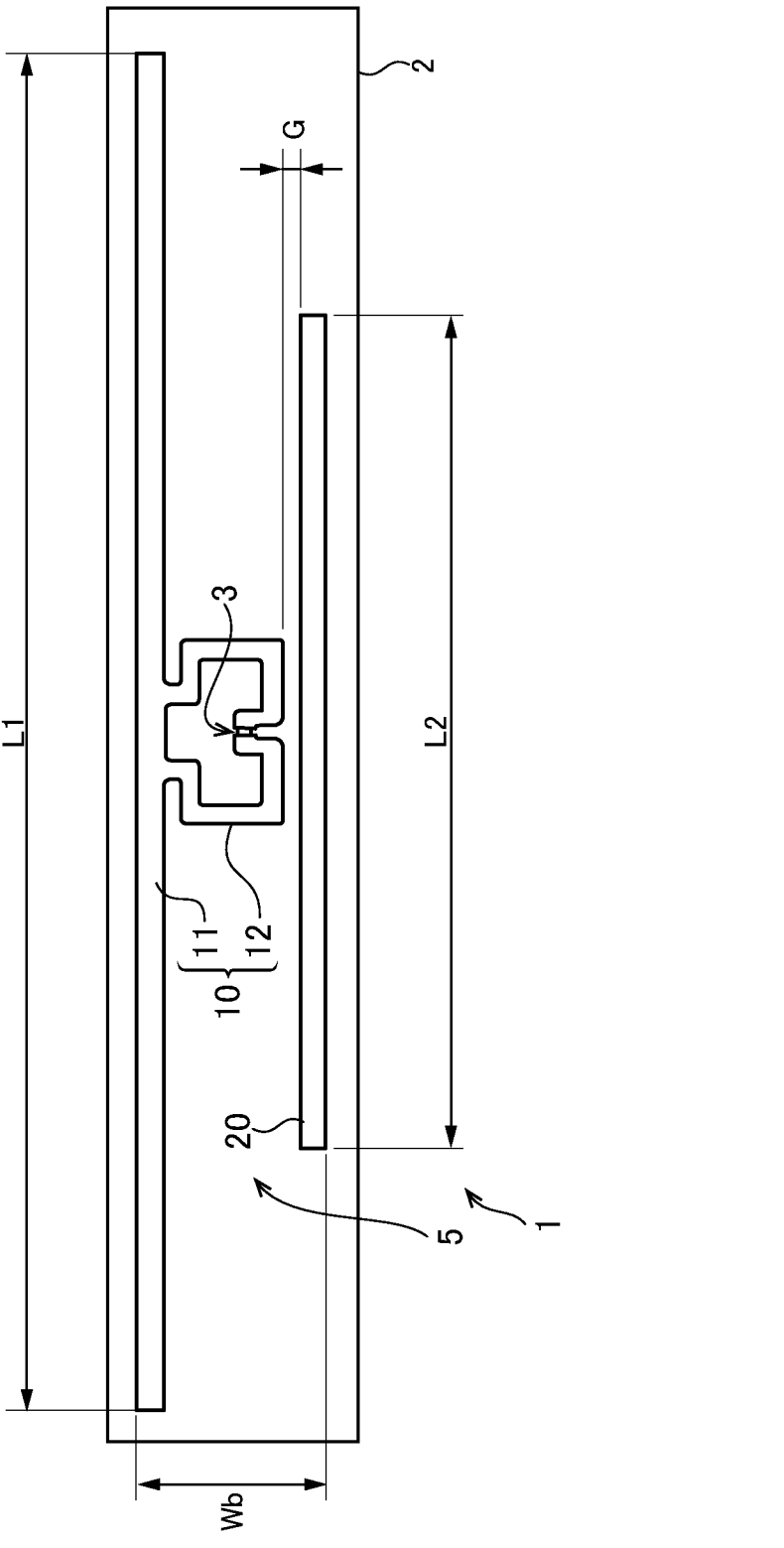
FIG. 1 is a plan view of an RFID inlay according to one embodiment.

The following describes an antenna pattern according to one embodiment of the present invention, and an RFID inlay in which the antenna pattern is incorporated.

The antenna pattern according to one embodiment includes a first element and a second element. The first element includes an electric power supply portion, i.e., a part electrically connected to an IC chip. The second element is provided apart from the first element. The two elements constitute the antenna pattern in order to ensure communication performance when the RFID inlay is attached to an attachment target having any relative permittivity in a wide range.

More specifically, the first element includes a loop portion and an emission portion. The loop portion includes a pair of the electric power supply portions. The emission portion is connected to the loop portion. The emission portion extends line-symmetrically from the loop portion. The emission portion operates as a dipole antenna to emit a radio wave. The loop portion is provided between the electric power supply portions and the emission portion, for the purpose of impedance matching between the IC chip and the emission portion.

Although the second element does not include an electric power supply portion, the second element operates as a dipole antenna by electromagnetic coupling with the loop portion of the first element. A distance between the second element and the loop portion may be short enough to allow the electromagnetic coupling to be induced between the second element and the loop portion and to thus excite current in the second element.

As described above, the first element and the second element each operate as the dipole antenna to emit a radio wave. In this case, the first element is formed in such a way that a half wavelength of the radio wave emitted from the first element is a first length. The second element is formed in such a way that a half wavelength of the radio wave emitted from the second element is a second length different from the first length. Either of the first element and the second element may be larger than the other of the first element and the second element. The first element and the second element are configured in such a way that the first length is different from the second length. Thereby, the first element and the second element can have mutually different resonance frequencies at the time of operating as the dipole antennas. Thus, the communication performance can be ensured when the RFID inlay is attached to an attachment target having any relative permittivity in a wide range.

For example, the first length of the first element is set in such a way that the first element emits a radio wave in the UHF band when the RFID inlay is attached to an attachment target having a relatively small relative permittivity. In this case, when the RFID inlay is attached to an attachment target having a relative permittivity larger than the relatively small relative permittivity, a frequency (peak frequency) at which the first element most satisfactorily operates is shifted to a lower-range side due to a wavelength shortening effect and fall outside the UHF band. In this case, the setting can be made as follows. The second length of the second element is set shorter than the first length. Thereby, when a frequency (peak frequency) at which the second element most satisfactorily operates is shifted to a lower-range side due to the above-mentioned wavelength shortening effect, this peak frequency falls within the UHF band or becomes close to the UHF band.

Thus, when the RFID inlay is attached to an attachment target having a relatively small relative permittivity, the first element mainly operates in the UHF band. Meanwhile, when the RFID inlay is attached to an attachment target having a relatively large relative permittivity, the second element mainly operates in the UHF band. As a result, the communication performance can be ensured when the RFID inlay is attached to an attachment target having any relative permittivity in a wide range.

Similarly, even when the second length of the second element is set longer than the first length, the communication performance can be ensured when the RFID inlay is attached to an attachment target having any relative permittivity in a wide range. In this case, the antenna pattern can be configured as follows. When the RFID inlay is attached to an attachment target having a relatively small relative permittivity, the second element mainly operates in the UHF band, and when the RFID inlay is attached to an attachment target having a relatively large relative permittivity, the first element mainly operates in the UHF band.

Lengths of the first element and the second element are each preferably larger than 30 mm and smaller than 175 mm. Lengths of the elements are each smaller than 175 mm in order to ensure that a resonance frequency of the dipole antenna is a value (in the UHF band) equal to or higher than 860 MHz. Lengths of the elements are each larger than 30 mm in order to enable the operation in the UHF band when the RFID inlay is attached to any of attachment targets that have relative permittivity in a wide range (from 1 to 80) and that include an attachment target having a relative permittivity close to 80 (in a case of water).

Shapes of the emission portion and the loop portion of the first element and a shape of the second element are, for example, set in such a way as to be adapted to a size of a substrate of the RFID inlay in which the antenna pattern is incorporated. However, these shapes are not limited to this example. Although a specific example of a shape of the antenna pattern is described below, the emission portion of the first element and the second element can each have a meander shape (serpentine shape), a bent shape, a folded-back shape, or the like.

The following more specifically describes the antenna pattern and the RFID inlay according to one embodiment.

Figure 2:
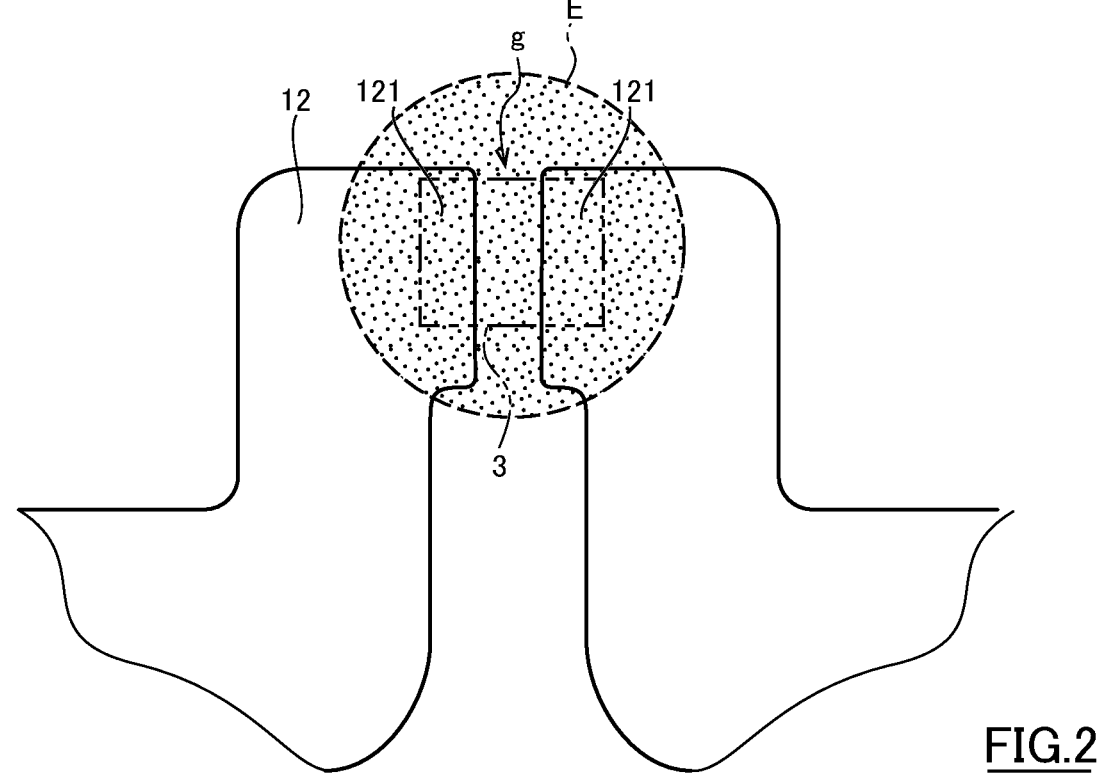
FIG. 2 is an enlarged view near an IC chip of the RFID inlay illustrated in FIG. 1.

FIG. 1 illustrates a plan view of the RFID inlay 1 according to one embodiment. FIG. 2 is an enlarged view near an IC chip 3 illustrated in FIG. 1. The IC chip 3 is indicated by the imaginary line in FIG. 2.

As illustrated in FIG. 1, the antenna pattern 5 is formed on the substrate 2 in the RFID inlay 1. The substrate 2 may be a paper substrate such as high-quality paper, medium-quality paper, or coated paper formed to include either of these, or may be a single resin film or a multilayer film constituted by a plurality of single resin films layered over each other. A thickness of the substrate 2 is preferably equal to or larger than 20 μm and equal to or smaller than 50 μm, from a viewpoint of strength for forming the antenna pattern 5 on the substrate 2 and mounting the IC chip 3 on the substrate 2, and from a viewpoint of handling easiness in the manufacturing.

The antenna pattern 5 is formed of a metal foil. Examples of metal that can be used for the antenna pattern 5 include copper and aluminum. The aluminum foil is preferably used from a viewpoint of reduction in manufacturing cost. A thickness of the metal foil is equal to or larger than 8 μm and equal to or smaller than 30 μm, for example.

The antenna pattern 5 is adhered to the substrate 2 by an adhesive (not illustrated) such as an acryl-based adhesive, a urethane-based adhesive, a silicone-based adhesive, or a rubber-based adhesive.

The IC chip 3 is a semiconductor package designed to be compatible with the UHF band and be able to communicate with a reader (not illustrated) as a reading device for the IC chip 3.

The loop portion 12 includes a pair of the electric power supply portions 121 at parts connected to the IC chip 3, as illustrated in FIG. 2. The respective electric power supply portions 121 are opposite to each other via a gap "g" in between. The electric power supply portions 121 are connected to respective contact points (not illustrated) of the IC chip 3 by an anisotropic conductive adhesive "E" that is applied to the electric power supply portions 121 and to the vicinity of the electric power supply portions 121. The anisotropic conductive adhesive "E" is a thermosetting or ultraviolet-curing anisotropic conductive adhesive in which conductive fillers or conductive particles adjusted to each have a predetermined particle size are mixed into binder resin that is an adhesive component. The anisotropic conductive material "E" is pressure-bonded by receiving heat or ultraviolet rays, in such a way as to make connection between the antenna pattern 5 and the IC chip 3 and between the substrate 2 and the IC chip 3, electrically and/or mechanically.

The antenna pattern 5 is configured to have a relatively simple shape, and includes the first element 10 and the second element 20, as illustrated in FIG. 1.

The first element 10 includes the emission portion 11 and the loop portion 12. The emission portion 11 is connected to the loop portion 12. The emission portion 11 extends line-symmetrically from the loop portion 12. The emission portion 11 is a part that operates as the dipole antenna to emit a radio wave. The emission portion 11 has a straight-line shape, and has a length L1 (one example of a first length). The loop portion 12 is provided for impedance matching between the IC chip 3 and the emission portion 11. The loop portion 12 extends in a loop shape from a pair of the electric power supply portions 121 toward the emission portion 11, as illustrated in FIG. 2.

The second element 20 has a straight-line shape, and has a length L2 (one example of the second length; L2 is different from L1). Although an electric power supply unit is not provided at the second element 20, the second element 20 is arranged close to the loop portion 12 of the first element. Thereby, current is excited in the second element 20 by the electromagnetic coupling between the second element 20 and the loop portion 12 of the first element. Thus, the second element 20 is configured to be allowed to operate as the dipole antenna.

Specifically, the second element 20 is provided apart by a gap "G" from the loop portion 12 of the first element 10, as illustrated in FIG. 1. The gap "G" is a distance small enough to allow the electromagnetic coupling to be induced between the second element 20 and the first element 10 and to thus excite current in the second element 20. The gap "G" is within a range from 50 μm to 5 mm, for example. The gap "G" larger than 5 mm makes it difficult for current to be excited in the second element 20. The gap "G" is preferably equal to or larger than 50 μm, from a viewpoint of the impedance matching.

Next, the electromagnetic field simulation results are described with reference to FIG. 3 to FIG. 5. The electromagnetic field simulation results indicate a relation between a communication distance and a frequency of a radio wave emitted in the case where the RFID inlay 1 is not attached to the attachment target and in the cases where the RFID inlays 1 are attached to attachment targets having various relative permittivity.

This simulation was performed for the antenna pattern 5 having the shape in which L1 is 130 mm, L2 is 80 mm, G is 1.7 mm, a width of the emission portion 11 is 2.7 mm, a width of the second element 20 is 2.5 mm, and a perpendicular width Wb of the antenna pattern 5 is 18.3 mm.

Each of the figures indicates the case where the second element 20 exists (i.e., the case where the RFID inlay 1 (working example) is attached to the attachment target) and the case where the second element 20 does not exist (i.e., the case where an inlay (comparative example) configured by removing the second element 20 from the RFID inlay 1 is attached to the attachment target). A communication distance in each of the figures is expressed as a value normalized in such a way as to take the maximum of 1 when the RFID inlay 1 is not attached to the attachment target.

FIG. 3 indicates the simulation results of the case without the attachment target and the case where the attachment target has a relative permittivity of 3 (Er=3). FIG. 4 indicates the simulation results of the case where the attachment target has a relative permittivity of 5 (Er=5) and the case where the attachment target has a relative permittivity of 7 (Er=7). FIG. 5 indicates the simulation results of the case where the attachment target has a relative permittivity of 12 (Er=12) and the case where the attachment target has a relative permittivity of 20 (Er=20).

First, in the RFID inlay of the comparative example, impedances of the first element 10 and the IC chip 3 match with each other roughly at two frequencies, and thus, a communication distance becomes peaks (local maximum values) at the two frequencies. For the RFID inlay of the comparative example, it is understood that a curve indicating a communication distance shifts to a lower-range side by the wavelength shortening effect, accompanying an increase in a relative permittivity of the attachment target as an attachment target, as indicated in FIG. 3 to FIG. 5. In other words, a frequency at which a communication distance becomes a peak is shifted to a lower-range side.

Meanwhile, in the RFID inlay 1 of the implementation example, as a relative permittivity of the attachment target of an attachment target is increased, the resonance of the second element 20 having a length different from that of the first element 10 can add one more point of a frequency at which a communication distance becomes a peak. Specifically, the third peak of a communication distance appears as indicated by the arrows in the simulation results (FIG. 4 and FIG. 5) in the cases of Er=7, 12, and 20. Thus, a decrease in a communication distance can be suppressed. For example, in the case of Er=12 (FIG. 5), a communication distance obtained by the RFID inlay in the comparative example decreases to become equal to or smaller than 0.2 in a frequency band of the vicinity of 950 MHz, whereas a communication distance obtained by the RFID inlay 1 in the implementation example can be maintained at a value equal to or larger than 0.5 in the frequency band of the vicinity of 950 MHz. This is because a frequency (peak frequency) at which the second element 20 having a length shorter than that of the first element 10 most satisfactorily operates is shifted to a lower-range side by the wavelength shortening effect, and thereby, the peak frequency falls within the UHF band or becomes close to the UHF band.

As described above, according to the RFID inlay 1 of one embodiment, the second element 20 having a length different from that of the first element 10 is arranged close to the loop portion 12 of the first element. Thus, current is excited in the second element 20 by the electromagnetic coupling between the second element 20 and the loop portion 12 of the first element. Thereby, the second element 20 is caused to function as the dipole antenna that resonates at a frequency different from that of the first element 10. As a result, the number of frequencies at each of which a communication distance becomes a peak can be made larger than that in the conventional case. Thus, a decrease in a communication distance can be suppressed even when the RFID inlay 1 is attached to an attachment target having any relative permittivity in a wide range.

A ratio between lengths of the first element and the second element is preferably set in such a way that when one of the first element and the second element has a length of 1, the other of the first element and the second element has a length equal to or smaller than 0.9. Setting the ratio in this manner can expand a frequency band in which a decrease in a communication distance in the UHF band can be suppressed when the RFID inlay 1 is attached to any of attachment targets having different relative permittivity.

In the RFID inlay 1 illustrated in FIG. 1, the emission portion 11 of the first element 10 and the second element 20 are each formed in a straight line in a longitudinal direction of the RFID inlay 1. Thus, the RFID inlay 1 as a whole has a laterally elongated form. For this reason, in some cases, the lateral width does not fit to a general-purpose label size when a printer performs printing on a front surface of an RFID label in which the RFID inlay 1 is incorporated. In light of this, forms of the emission portion 11 of the first element 10 and the second element 20 may be modified in such a way as to reduce a lateral width of the RFID inlay.

Figure 6:
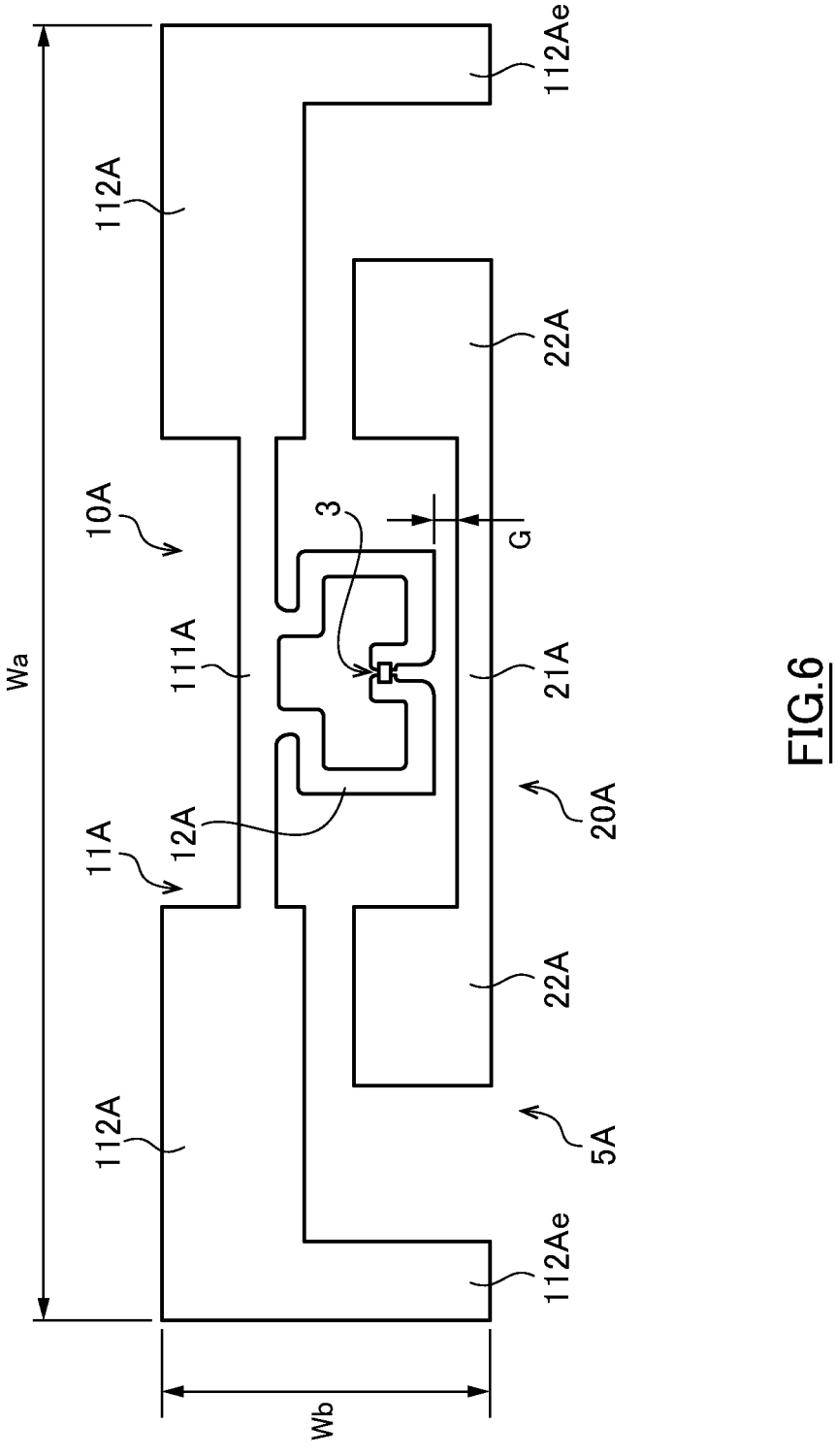
FIG. 6 is a plan view of an RFID inlay according to one embodiment.
Figure 7:
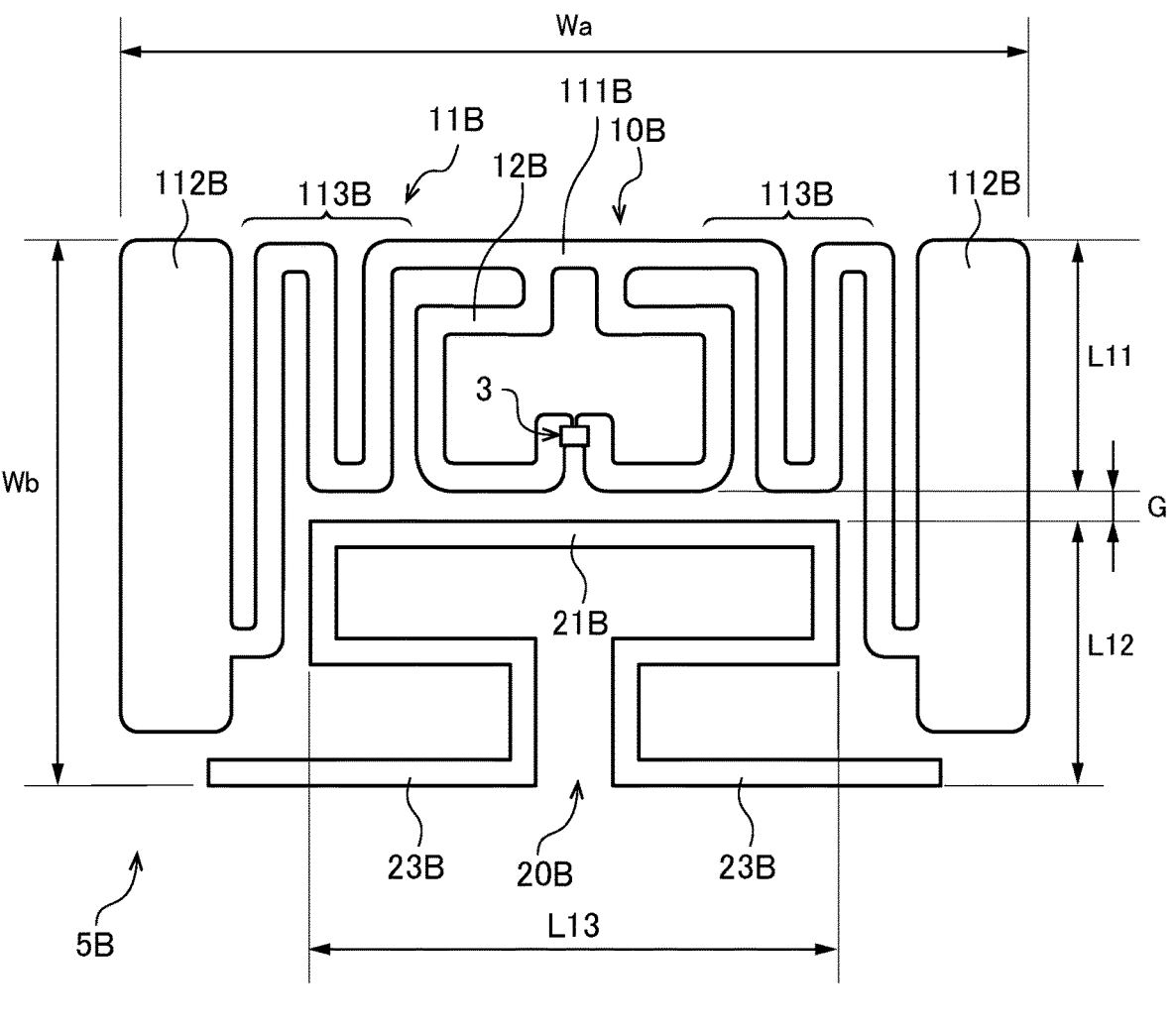
FIG. 7 is a plan view of an RFID inlay according to one embodiment.

FIG. 6 and FIG. 7 each illustrate one example of an antenna pattern that fits to an inlay having a lateral width smaller than that of the RFID inlay 1 in FIG. 1. The following describes these antenna patterns.

The antenna pattern 5A illustrated in FIG. 6 includes a first element 10A and a second element 20A.

The first element 10A includes an emission portion 11A and a loop portion 12A. The loop portion 12A is connected to the IC chip 3, similarly to the case illustrated in FIG. 2.

The emission portion 11A of the first element 10A includes a straight-line portion 111A and a widened portion 112A. The straight-line portion 111A extends line-symmetrically from a center position of the antenna pattern 5A in a longitudinal direction and extends in a straight line along the longitudinal direction. The widened portion 112A extends line-symmetrically from both ends of the straight-line portion 111A. The widened portion 112A is formed to have a width larger than that of the straight-line portion 111A. Since the widened portion 112A can add a capacitance component (that is, due to capacity loading), the antenna can be reduced in size. In other words, a lateral width Wa can be reduced.

The widened portion 112A includes both ends bent at a right angle to form bent portions 112Ae, as illustrated in FIG. 6. Thus, a lateral width Wa of the antenna pattern 5A can be reduced.

The second element 20A includes a straight-line portion 21A and a widened portion 22A. The straight-line portion 21A extends line-symmetrically from a center position of the antenna pattern 5A in a longitudinal direction and extends in a straight line along the longitudinal direction. The straight-line portion 21A and the loop portion 12A are separated from each other by the predetermined gap "G."

The widened portion 22A extends line-symmetrically from both ends of the straight-line portion 21A. The widened portion 22A is formed to have a width larger than that of the straight-line portion 21A. Providing the widened portion 22A can add a capacitance component. Thus, the antenna can be reduced in size. In other words, a lateral width of the antenna can be reduced.

The widened portion 22A includes both ends bent at a right angle, as illustrated in FIG. 6. Thus, the second element 20A can be accommodated between the bent portions 112Ae at both ends of the first element 10A.

A lateral width of the antenna pattern 5A is defined as Wa, and a perpendicular width of the antenna pattern 5A is defined as Wb. By setting of Wa=94 mm and Wb (i.e., a perpendicular width of the widened portion 112A)=24 mm, the antenna pattern 5A enables the second element to function similarly to the antenna pattern 5 obtaining the simulation results of FIG. 3 to FIG. 5. The above-mentioned values of Wa and Wb allow the setting in which a lateral width of the loop portion 12A is 18 mm, a lateral width of the second element 20A is 60 mm, a perpendicular width of the widened portion 22A is 10 mm, and the gap "G" is 1.7 mm, for example.

The antenna pattern 5 obtaining the simulation results of FIG. 3 to FIG. 5 has a lateral width of 130 mm. Meanwhile, the shape of the antenna pattern 5A in FIG. 6 has a lateral width of 94 mm, and thus the lateral width of the antenna pattern can be significantly shortened.

The antenna pattern 5B illustrated in FIG. 7 includes a first element 10B and a second element 20B.

The first element 10B includes an emission portion 11B and a loop portion 12B. The loop portion 12B is connected to the IC chip 3, similarly to the case illustrated in FIG. 2.

The emission portion 11B of the first element 10B includes a straight-line portion 111B, a widened portion 112B, and a meander portion 113B (one example of a meander portion). The straight-line portion 111B extends line-symmetrically from a longitudinal direction center position of the antenna pattern 5B and in a straight line along the longitudinal direction. The widened portion 112B is formed to have a width larger than that of each of the straight-line portion 111B and the meander portion 113B. The widened portion 112B is provided at both lateral-direction ends of the antenna pattern 5B. The meander portion 113B is interposed between the straight-line portion 111B and the widened portion 112B. Providing the meander portion 113B eliminates necessity of increasing a lateral width in order to ensure a length of a half wavelength of a radio wave emitted from the first element 10B.

The second element 20B includes a straight-line portion 21B and a folded-back portion 23B. The straight-line portion 21B extends line-symmetrically from a longitudinal direction center position of the antenna pattern 5B and in a straight line along the longitudinal direction. The straight-line portion 21B and the loop portion 12B are separated from each other by the predetermined gap "G."

As illustrated in FIG. 7, the folded-back portion 23B is provided in such a way as to extend line-symmetrically from both ends of the straight-line portion 21B. The folded-back portion 23B is folded back twice in a course of extending from both ends of the straight-line portion 21B to a terminal end of the folded-back portion 23B. The terminal end is located approximately on an inner side of the widened portion 112B of the first element 10B. Providing the folded-back portion 23B eliminates necessity of increasing a lateral width in order to ensure a length of a half wavelength of a radio wave emitted from the second element 20B. The second element 20B may include a meander portion, instead of the folded-back portion 23B or in addition to the folded-back portion 23B.

A lateral width of the antenna pattern 5B is defined as Wa, and a perpendicular width of the antenna pattern 5B is defined as Wb. In this case, setting of Wa=50 mm and Wb=30 mm enables the second element to function similarly to the antenna pattern 5 obtaining the simulation results of FIG. 3 to FIG. 5. The above-mentioned values of Wa and Wb allow the setting in which sizes L11, L12, and L13, and "G" in FIG. 7 are 14 mm, 15 mm, 29 mm, and 1 mm, respectively, for example. In this case, the lateral width (50 mm) of the antenna pattern 5B is a value that has been reduced further from the exemplary width (94 mm) of the antenna pattern 5A illustrated in FIG. 6.

The first element and the second element in the RFID inlay according to one embodiment do not need to be on the same flat surface of the substrate. FIG. 8 illustrates an example in which the first element 10 and the second element 20 illustrated in FIG. 1 are arranged on a front surface and a back surface of the substrate 2, respectively. In a case where a thickness of the substrate 2 is a value within a range from approximately several tens of micrometers to approximately several hundreds of micrometers, even when the first element 10 and the second element 20 are arranged on the different surfaces, both of the elements can be separated from each other by a predetermined distance via the thickness of the substrate 2.

Figure 9:
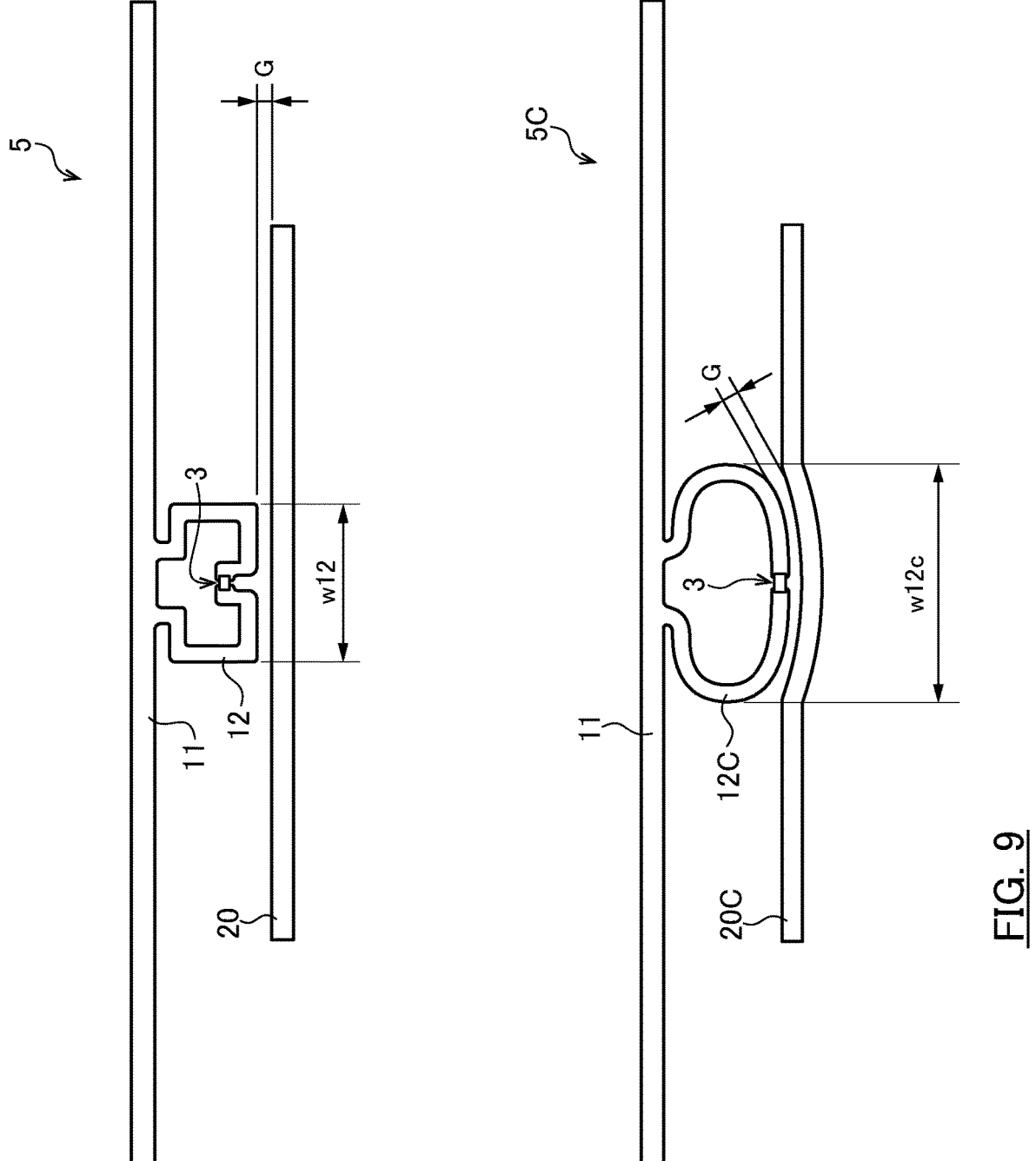
FIG. 9 illustrates a modified example of a loop portion for the antenna pattern according to one embodiment.

In one embodiment of the RFID inlay, a general shape of the loop portion of the first element is not limited to a rectangular shape as illustrated in FIG. 1, FIG. 6, and FIG. 7, but may be circular or elliptical. FIG. 9 illustrates the antenna pattern 5 having the rectangular loop portion 12 similar to that in FIG. 1, and an antenna pattern 5C having an elliptical loop portion 12C. In the antenna pattern 5, a part (a range indicated by the width w12) of the second element 20 is formed to be along a straight-line-shape part included in the loop portion 12 and closest to the second element 20 while separated by the predetermined gap "G" from the straight-line-shape part, as illustrated in FIG. 9. In the antenna pattern 5C, a part (a range indicated by the width w12c) of the second element 20C is formed to be curved along a curved-shape part of the loop portion 12C while separated by the predetermined gap "G" from the curved-shape part. Forming the part of the second element 20 in this manner enables the second element to induce stronger electromagnetic coupling with the first element.

Although the embodiments of the antenna pattern and the RFID inlay according to the present invention are described above, the present invention is not limited to the above-described embodiments. The above-described embodiments can be each variously improved or modified within a scope that does not depart from the essence of the present invention. For example, each of the technical features described in each of the above-described embodiments and modified examples can be appropriately combined with a part or all of the other embodiments and modified examples as long as a technical contradiction does not occur.

The present invention is related to Japanese Patent Application No. 2022-018039 filed with the Japan Patent Office on Feb. 8, 2022, the entire contents of which are incorporated into this description by reference.

The invention claimed is:

1. An antenna pattern used in a UHF-band RFID inlay, comprising:
   a first element formed to include a loop portion and an emission portion, the loop portion including a pair of electric power supply portions, the emission portion being connected to the loop portion and extending line-symmetrically from the loop portion, the emission portion operating as a first dipole antenna that resonates at a first frequency and emits a first radio wave having a first half wavelength, wherein the first element has a first length equal to the first half wavelength of the first radio wave; and a second element formed apart from the first element, the second element operating as a second dipole antenna that resonates at a second frequency and emits a second radio wave having a second half wavelength, by electromagnetic coupling with the first element, wherein the second frequency is different from the first frequency and the second half wavelength is different from the first half wavelength, wherein the second element has a second length equal to the second half wavelength of the second radio wave.

2. The antenna pattern according to claim 1, wherein a part of the second element is formed to extend along an outer edge of the loop portion of the first element while separated from the loop portion by a predetermined distance.

3. The antenna pattern according to claim 2, wherein the predetermined distance is within a range from 50 μm to 5 mm.

4. The antenna pattern according to claim 2, wherein the second element includes a meander portion.

5. The antenna pattern according to claim 2, wherein the second element comprises:
   a straight-line portion extending line-symmetrically from a center position in a longitudinal direction of the antenna pattern and extending in a straight line along the longitudinal direction; and
   a widened portion extending line-symmetrically from both ends of the straight-line portion and having a first width larger than a second width of the straight-line portion.

6. The antenna pattern according to claim 2, wherein the second element comprises:
   a straight-line portion extending line-symmetrically from a center position in a longitudinal direction of the antenna pattern and extending in a straight line along the longitudinal direction; and
   a folded-back portion extending line-symmetrically from both ends of the straight-line portion and extending in such a way as to be folded back toward the center position.

7. The antenna pattern according to claim 1, wherein a ratio of the first length to the second length is 0.9 or less, or a ratio of the second length to the first length is 0.9 or less.

8. The antenna pattern according to claim 1, wherein the second element includes a meander portion.

9. The antenna pattern according to claim 8, wherein the second element comprises:
   a straight-line portion extending line-symmetrically from a center position in a longitudinal direction of the antenna pattern and extending in a straight line along the longitudinal direction; and
   a widened portion extending line-symmetrically from both ends of the straight-line portion and having a width larger than a width of the straight-line portion.

10. The antenna pattern according to claim 8, wherein the second element comprises:
   a straight-line portion extending line-symmetrically from a center position in a longitudinal direction of the antenna pattern and extending in a straight line along the longitudinal direction; and
   a folded-back portion extending line-symmetrically from both ends of the straight-line portion and extending in such a way as to be folded back toward the center position.

11. The antenna pattern according to claim 1, wherein the second element comprises:
   a straight-line portion extending line-symmetrically from a center position in a longitudinal direction of the antenna pattern and extending in a straight line along the longitudinal direction; and a widened portion extending line-symmetrically from both ends of the straight-line portion and having a first width larger than a second width of the straight-line portion.

12. The antenna pattern according to claim 1, wherein the second element comprises:

a straight-line portion extending line-symmetrically from a center position in a longitudinal direction of the antenna pattern and extending in a straight line along the longitudinal direction; and a folded-back portion extending line-symmetrically from both ends of the straight-line portion and extending in such a way as to be folded back toward the center position.

13. An RFID inlay comprising:

a substrate;

an antenna pattern formed on the substrate, the antenna pattern comprising:

a first element formed to include a loop portion and an emission portion, the loop portion including a pair of electric power supply portions, the emission portion being connected to the loop portion and extending line-symmetrically from the loop portion, the emission portion operating as a first dipole antenna that resonates at a first frequency and emits a first radio wave having a first half wavelength, wherein the first element has a first length equal to the first half wavelength of the first radio wave; and a second element formed apart from the first element, the second element operating as a second dipole antenna that resonates at a second frequency and emits a second radio wave having a second half wavelength, by electromagnetic coupling with the first element, wherein the second frequency is different from the first frequency and the second half wavelength is different from the first half wavelength, wherein the second element has a second length equal to the second half wavelength of the second radio wave; and an IC chip connected to the pair of electric power supply portions of the antenna pattern.

14. The RFID inlay according to claim 13, wherein a part of the second element is formed to extend along an outer edge of the loop portion of the first element while separated from the loop portion by a predetermined distance.

15. The RFID inlay according to claim 14, wherein the predetermined distance is within a range from 50 μm to 5 mm.

16. The RFID inlay according to claim 13, wherein a ratio of the first length to the second length is 0.9 or less, or a ratio of the second length to the first length is 0.9 or less.

17. The RFID inlay according to claim 13, wherein the second element includes a meander portion.

18. The RFID inlay according to claim 13, wherein the second element comprises:

a straight-line portion extending line-symmetrically from a center position in a longitudinal direction of the antenna pattern and extending in a straight line along the longitudinal direction; and a widened portion extending line-symmetrically from both ends of the straight-line portion and having a first width larger than a second width of the straight-line portion.

19. The RFID inlay according to claim 13, wherein the second element comprises:

a straight-line portion extending line-symmetrically from a center position in a longitudinal direction of the antenna pattern and extending in a straight line along the longitudinal direction; and a folded-back portion extending line-symmetrically from both ends of the straight-line portion and extending in such a way as to be folded back toward the center position.

* * * * *